United States Patent
Teel, Jr.

(10) Patent No.: US 6,783,684 B2
(45) Date of Patent: Aug. 31, 2004

(54) WATER SOFTENING APPARATUS AND ASSOCIATED METHOD FOR SENSING DEPLETION OF SALT IN A BRINE TANK

(76) Inventor: Paul A. Teel, Jr., 7681 Wilson Mills Rd., Chesterland, OH (US) 44026

(*) Notice: Subject to any disclaimer, the term of this patent is extended or adjusted under 35 U.S.C. 154(b) by 286 days.

(21) Appl. No.: 09/957,564

(22) Filed: Sep. 20, 2001

(65) Prior Publication Data
US 2003/0052060 A1 Mar. 20, 2003

(51) Int. Cl.⁷ .................................................. C02F 1/42
(52) U.S. Cl. ..................... 210/687; 210/85; 210/190; 210/191; 210/206; 210/269; 210/687
(58) Field of Search .......................... 210/85, 190, 191, 210/206, 269, 687

(56) References Cited

U.S. PATENT DOCUMENTS

| | | | |
|---|---|---|---|
| 3,676,336 A | | 7/1972 | O'Brien et al. |
| 4,136,563 A | * | 1/1979 | Mueller et al. ........... 73/861.03 |
| 4,275,448 A | * | 6/1981 | Le Dall ....................... 700/271 |
| 4,320,010 A | | 3/1982 | Tucci et al. |
| 4,687,997 A | * | 8/1987 | Tao ............................. 324/439 |
| 4,751,466 A | * | 6/1988 | Colvin et al. ............... 324/449 |
| 4,880,513 A | * | 11/1989 | Davis et al. ................ 204/519 |
| 5,234,601 A | | 8/1993 | Janke et al. |
| 5,480,555 A | | 1/1996 | Momber |
| 5,540,845 A | | 7/1996 | Blanchard et al. |
| 6,080,316 A | | 6/2000 | Tonelli et al. |
| 6,126,834 A | | 10/2000 | Tonelli et al. |
| 2002/0017495 A1 | * | 2/2002 | Iizuka et al. ................ 210/739 |

FOREIGN PATENT DOCUMENTS

JP           06288812 A  * 10/1994   ........... G01F/23/18

* cited by examiner

Primary Examiner—Chester T. Barry
(74) Attorney, Agent, or Firm—Pearne & Gordon LLP

(57) ABSTRACT

A water softening apparatus (10) comprises a regeneration tank (12) and a brine tank (14). An ion exchange resin (26) is located within the regeneration tank (12) and salt (38) is located within the brine tank (14). Water mixes with the salt (38) in the brine tank (14) to form a brine solution. A tube (56) is connected with the brine tank (14) and receives a flow of brine solution from the brine tank (14). A sensor (86) is mounted in the tube (56) for sensing the conductivity of the brine solution as the brine solution flows through the tube (56). The sensor (86) generates a signal indicative of the conductivity of the brine solution. The conductivity of the brine solution is indicative of an amount of salt in the brine solution.

20 Claims, 5 Drawing Sheets

WATER SOFTENING APPARATUS AND ASSOCIATED METHOD FOR SENSING DEPLETION OF SALT IN A BRINE TANK

TECHNICAL FIELD

The present invention relates to a water softening apparatus and an associated method. More particularly, the present invention relates to a water softening apparatus having a sensor and associated method for sensing depletion of salt in a brine tank.

BACKGROUND OF THE INVENTION

A known water softening apparatus includes a brine tank. The brine tank includes salt, usually in pellet form. Water is input into the brine tank and a brine solution is formed. The brine solution generally is water saturated with salt.

The brine solution is used during a regeneration cycle to regenerate an ion exchange resin located within a regeneration tank of the water softening apparatus. The brine solution replaces hardness ions being held by the ion exchange resin with sodium ions or potassium ions. The brine solution is then purged from the regeneration tank.

After each regeneration cycle, the amount of salt in the brine tank is reduced. Eventually, the salt in the brine tank will be depleted and the brine solution formed will not be saturated with salt. This unsaturated brine solution will not sufficiently regenerate the ion exchange resin in the regeneration tank. As a result, salt must be added to the brine tank so that proper regeneration of the ion exchange resin may take place.

SUMMARY OF THE INVENTION

In accordance with one aspect, the present invention provides a water softening apparatus that includes a regeneration tank for receiving hard water and for outputting softened water. An ion exchange resin is located within the regeneration tank for exchanging hardness ions in hard water with sodium or potassium ions. The water softening apparatus further includes a brine tank. Salt is located within the brine tank for mixing with water to form a brine solution. The brine solution is input into the regeneration tank to regenerate the ion exchange resin. A tube is connected with the brine tank and receives a flow of brine solution from the brine tank. A sensor is mounted in the tube for sensing the conductivity of the brine solution as the brine solution flows through the tube. The sensor generates a signal indicative of the conductivity of the brine solution. The conductivity of the brine solution is indicative of an amount of salt in the brine solution.

In accordance with another aspect, the present invention provides a water softening apparatus that includes a regeneration tank and a brine tank. An ion exchange resin is located within the regeneration tank for exchanging hardness ions in hard water with sodium or potassium ions. Salt is located within the brine tank for mixing with water to form a brine solution. The brine solution is input into the regeneration tank to regenerate the ion exchange resin. The water softening apparatus also includes a sensor and a controller. The sensor generates an output signal having a frequency that is indicative of the conductivity of the brine solution. The controller receives the output signal of the sensor and monitors the frequency of the output signal over a period of time. A change in frequency that exceeds a threshold amount is indicative of a depletion of salt in the brine tank.

In accordance with another aspect, the present invention provides a method within a water softening apparatus. Hardness ions in hard water are exchanged with sodium or potassium ions via an ion exchange resin located within a regeneration tank. Salt is mixed with water to form a brine solution within a brine tank. Brine solution is introduced into the regeneration tank to regenerate the ion exchange resin, with the input occurring via flow through a tube connected with the brine tank and the regeneration tank. The conductivity of the brine solution is sensed as the brine solution flows through the tube. A signal indicative of the conductivity of the brine solution is generated. The conductivity of the brine solution is indicative of an amount of salt in the brine solution.

In accordance with yet another aspect, the present invention provides a method within a water softening apparatus. Hardness ions in hard water are exchanged with sodium or potassium ions via an ion exchange resin located within a regeneration tank. Salt is mixed with water to form a brine solution within a brine tank. Brine solution is input into the regeneration tank to regenerate the ion exchange resin, with the input occurring via flow through a tube connected with the brine tank and the regeneration tank. The conductivity of the brine solution is sensed as the brine solution flows through the tube. An output signal that has a frequency indicative of the conductivity of the brine solution is generated. The conductivity of the brine solution is indicative of an amount of salt in the brine solution.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF AN EXAMPLE EMBODIMENT

Figure 1:
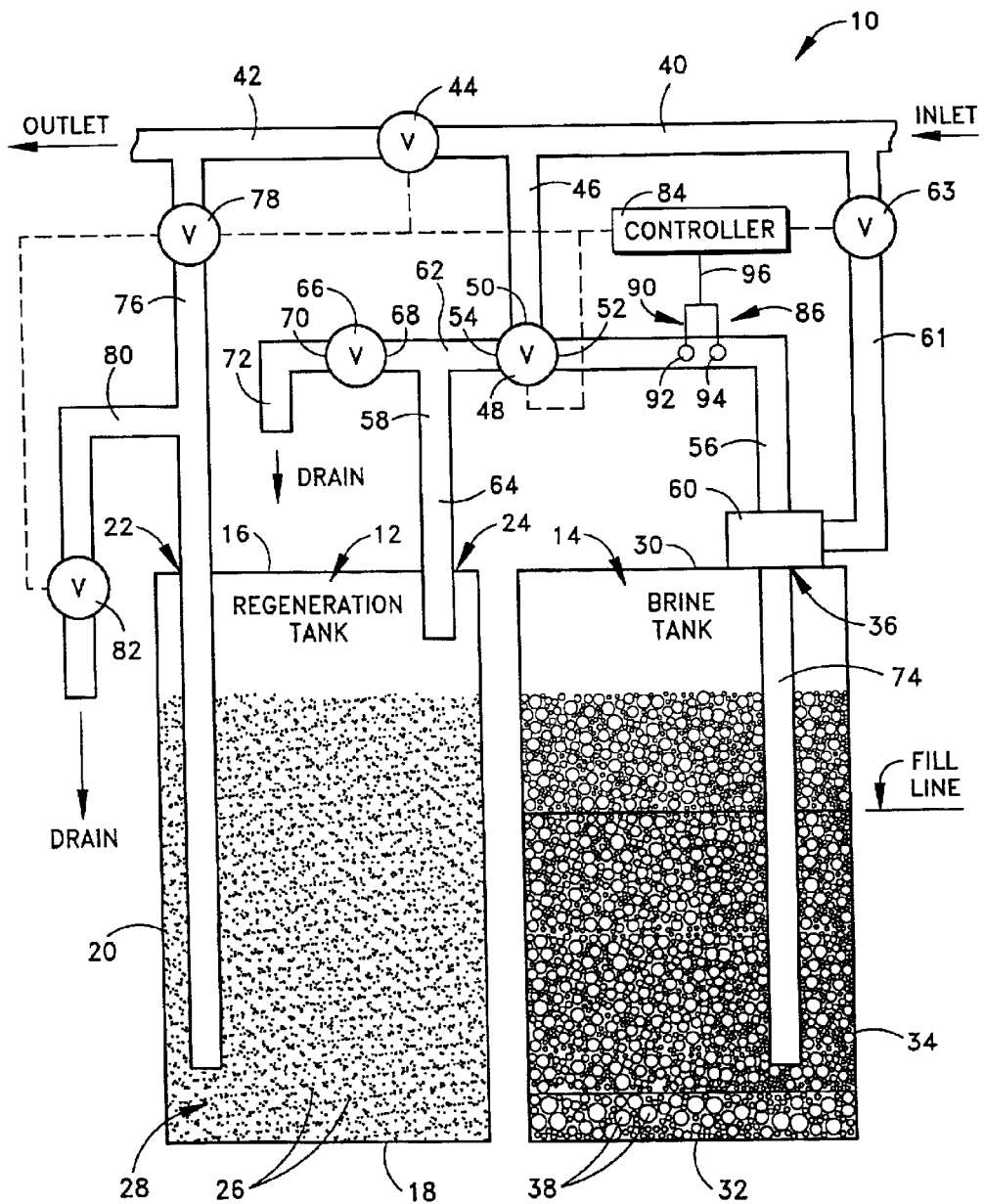
FIG. 1 is a schematic illustration of a water softening apparatus constructed in accordance with the present invention.

FIG. 1 is a schematic illustration of a water softening apparatus 10 constructed in accordance with the present invention. The water softening apparatus 10 receives hard water and outputs softened water. The water softening apparatus 10 includes a regeneration tank 12 and a brine tank 14.

In one example, the regeneration tank 12 is cylindrical and includes a top surface 16 and a bottom surface 18. Both of the top and bottom surfaces 16 and 18 extend perpendicular to a cylindrical sidewall 20 of the regeneration tank 12. The top surface 16 of the regeneration tank 12 includes two holes 22 and 24 for receiving tubes. An ion exchange resin 26 is located within the regeneration tank 12. The ion exchange resin 26 forms a resin bed 28 within the regeneration tank 12. The resin bed 28 extends from the bottom surface 18 of the regeneration tank 12 upward through approximately eighty percent of the regeneration tank 12.

In one example, the brine tank 14 is cylindrical and includes a top surface 30 and a bottom surface 32. Both of the top and bottom surfaces 30 and 32 extend perpendicular to a cylindrical sidewall 34 of the brine tank 14. The top surface 30 of the brine tank 14 includes one hole 36 for receiving a tube. Salt 38, generally in pellet form, is located within the brine tank 14.

FIG. 1 also shows a piping arrangement for the water softening apparatus 10. The piping arrangement may be modified without affecting the scope of the present invention.

The piping arrangement illustrated in FIG. 1 includes an inlet pipe 40 and an outlet pipe 42. The inlet pipe 40 generally transports hard water to the water softening apparatus 10 and the outlet pipe 42 generally transports softened water away from the water softening apparatus 10. The inlet pipe 40 is connected to the outlet pipe 42 by a first valve 44. The first valve 44 is normally in a closed position. The first valve 44 may be opened to allow hard water to bypass the water softening apparatus 10 and flow directly from the inlet pipe 40 to the outlet pipe 42.

A feed tube 46 extends from the inlet pipe 40 in a location prior to the first valve 44. The feed tube 46 transports hard water from the inlet pipe 40 to a second valve 48. The second valve 48 is a four-position valve. The four positions include one closed position, in which water is prevented from passing through the second valve 48, and three open positions. The three open positions will be discussed below.

The second valve 48 has three ports. A first port 50 of the second valve 48 is located on an end of the feed tube 46, opposite the inlet pipe 40. A second port 52 of the second valve 48 connects to an end of a connecting tube 56. A third port 54 of the second valve connects to a T-shaped tube 58.

The connecting tube 56, as illustrated in FIG. 1, is L-shaped. As stated above, one end of the connecting tube 56 connects to the second port 52 of the second valve 48. An opposite end of the connecting tube 56 connects to a mechanism 60 for moving brine solution from the brine tank 14. In one example that is shown in FIG. 1, the mechanism 60 is a Bernoulli mechanism. The Bernoulli mechanism 60 is connected to the inlet pipe 40 via a pipe 61 with a valve 63.

Of course, it is to be appreciated that other structures are possible. For example, the mechanism 60 may include a pump located near the brine tank 14.

The T-shaped tube 58 includes a horizontal branch 62 and a vertical branch 64. The horizontal branch 62 of the T-shaped tube 58 extends between the third port 54 of the second valve 48 and a third valve 66. The vertical branch 64 of the T-shaped tube 58 extends downwardly from the center of the horizontal branch 62. The vertical branch 64 of the T-shaped tube 58 extends into hole 24 in the top surface 16 of the regeneration tank 12 and terminates near the top surface 16 of the regeneration tank 12.

The third valve 66 includes an inlet port 68 and an outlet port 70. An end of the horizontal branch 62 of the T-shaped tube 58 connects to the inlet port 68 of the third valve 66. A first drain tube 72 connects to the outlet port 70 of the third valve 66. The third valve 66 is normally closed, but may be opened to allow flow through the first drain tube 72 to a drain.

A brine tank tube 74 is also connected to the mechanism 60. The brine tank tube 74 extends downwardly from the mechanism 60 and into the hole 36 on the top surface 30 of the brine tank 14. The brine tank tube 74 terminates near the bottom surface 32 of the brine tank 14.

An outlet tube 76 connects with the outlet pipe 42 in a location near the first valve 44. The outlet tube 76 extends downwardly from the outlet pipe 42 and into hole 22 in the top surface 16 of the regeneration tank 12. The outlet tube 76 terminates near the bottom surface 18 of the regeneration tank 12. A fourth valve 78 bisects the outlet tube 76 in a location between the outlet pipe 42 and the regeneration tank 12. The fourth valve 78 has a normally open position.

A second drain tube 80 extends from the outlet tube 76 in a location between the fourth valve 78 and the regeneration tank 12. A fifth valve 82 bisects the second drain tube 80. The fifth valve 82 is normally closed, but may be opened to allow flow through the second drain tube 80 to a drain.

The water softening apparatus 10 further includes a controller 84. The controller 84 is electrically connected to each valve, as shown schematically in FIG. 1. The controller 84 generates signals to control the position of each valve.

Figure 3:
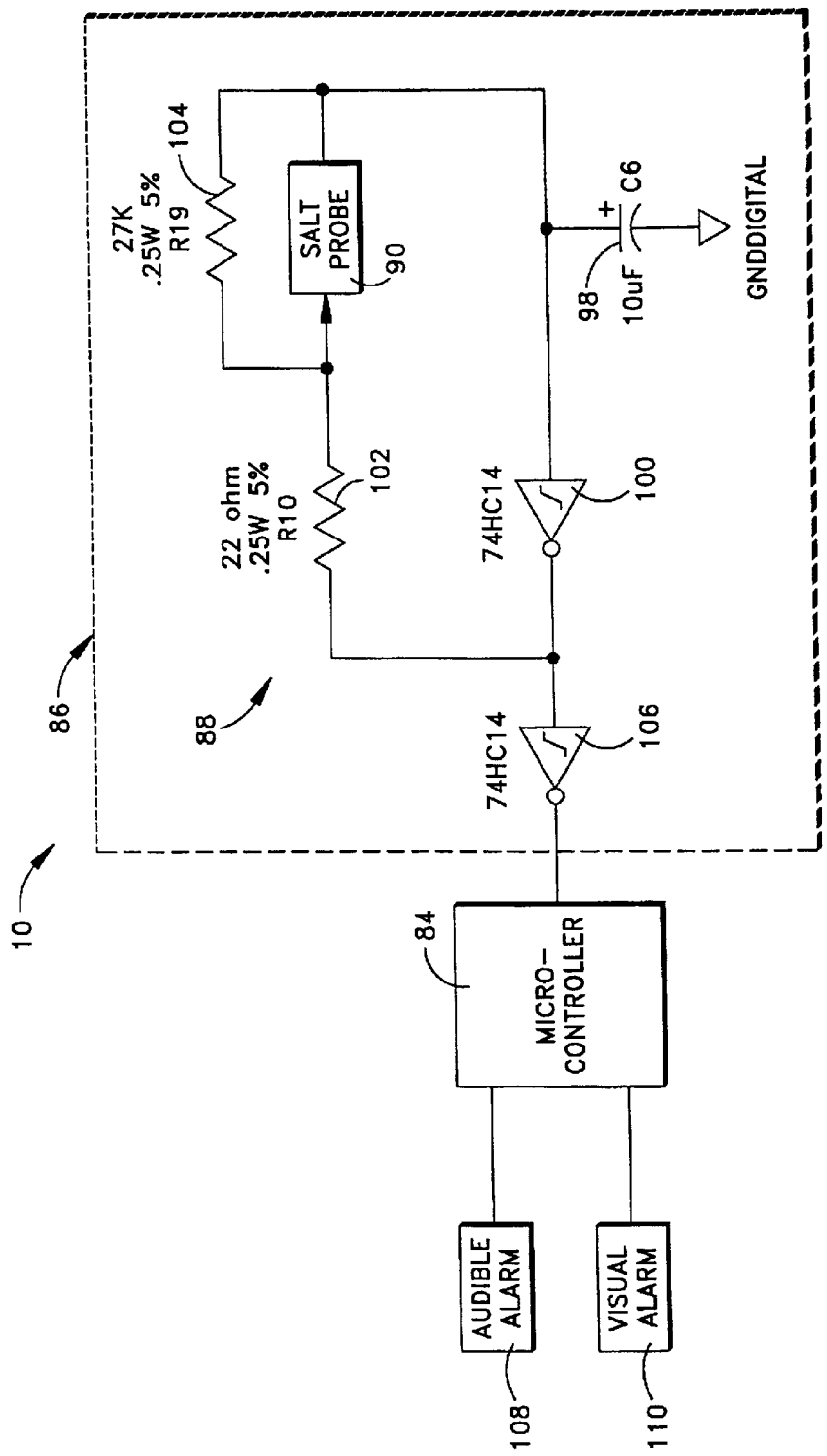
FIG. 3 is an electrical schematic of the water softening apparatus of FIG. 1.

The water softening apparatus 10 further includes a sensor 86. As shown in FIG. 3, the sensor 86 includes a monitoring circuit 88 and a probe 90. The probe includes two electrodes 92 and 94 (FIG. 1) and a two-wire cable 96 (FIG. 1). The two-wire cable 96 extends through a wall of the connecting tube 56 and the two electrodes 92 and 94 are held within the connecting tube 56. In one example, each electrode is formed from type 2 Titanium.

FIG. 3 is an electric schematic of the water softening apparatus 10. As shown in FIG. 3, the monitoring circuit 88 includes a capacitor 98. In one example, the capacitor 98 is a ten microfarad capacitor. The charging and discharging of the capacitor 98 through the probe impedance generates an oscillating electrical signal.

The oscillating electrical signal from the capacitor 98 is passed through a first digital inverter 100. The first digital inverter 100 is a 74HC14 Hex inverting Schmitt trigger such as that available from Philips Semiconductor. The first digital inverter 100 charges the capacitor 98 through the probe impedance until the voltage on the capacitor reaches the Schmitt trigger high level input threshold. Upon reaching the high level input threshold, the first digital inverter 100 changes states and discharges the capacitor 98 through the probe impedance until the voltage on the capacitor 98 reaches the Schmitt trigger low level input threshold. Upon reaching the low level input threshold, it again changes states and begins charging the capacitor 98.

The output of the first digital inverter 100 is input into a first resistor 102. The first resistor 102, in series with a parallel wired second resistor 104 and the probe 90, acts as a current limit and sets the maximum frequency for the monitoring circuit 88. In one example, an output from the monitoring circuit 88 has a frequency ranging from about ten Hertz to about 2,200 Hertz.

The probe 90 is wired in parallel connection with the second resistor 104. The second resistor 104 is 27 kilo-ohm resistor with a five-percent tolerance and a power rating of 0.25 watts. The second resistor 104 guarantees that oscillation will not stop as the impedance between the electrodes of the probe 90 increases.

The sensor 86 operates when the brine solution is flowing over the electrodes 92 and 94 of the probe 90. The sensor 86 sends an electrical signal between the electrodes 92 and 94 and determines the conductivity of the brine solution. Salt in the brine solution makes the brine solution conductive. As the level of salt in the brine solution decreases, the conductivity decreases. Decreased conductivity means increased resistance and impedance of the electrical signal sent between the electrodes 92 and 94.

Frequency is inversely related to impedance. The output signal is input into a second digital inverter 106. The second digital inverter 106 is a 74HC14 Hex inverting Schmitt trigger. The output from the second digital inverter 106 is a square wave output signal.

The square wave output signal is input into a controller 84, as shown in FIG. 3. The controller 84 monitors the frequency of the output signal over a period of time. If the frequency of the output signal decreases over time, the frequency is said to have a slope that is less than zero. As will be discussed in further detail below, when the slope is less than zero, the controller 84 determines that the salt 38 in the brine tank 14 is depleted. As a result, the controller 84 outputs a signal to either or both of an audible alarm 108 and a visual alarm 110. The alarms 108 and 110 indicate that salt 38 should be added to the brine tank 14 of the water softening apparatus 10.

Prior to beginning a normal softening operation, water enters the water softening apparatus 10 through the inlet pipe 40. The first valve 44 is closed so the water flows through the feed tube 46 to the second valve 48. At this time, the second valve 48 is positioned in a first open position. In the first open position, the second valve 48 directs water into the connecting tube 56, into the brine tank tube 74, and into the brine tank 14. The water is held in the brine tank 14 where the water mixes with salt 38 to form a brine solution. Typically, the brine solution becomes fully saturated with salt 38.

After the brine tank is filled to a fill line, shown at 112 in FIG. 1, with water, the second valve 48 is switched to a second open position and normal softening operation begins. During normal softening operation, the second valve 48 is in a second open position and directs water into the horizontal branch 62 of the T-shaped tube 58. At this time, the third valve 66 is closed. Thus, all of the water flowing into the T-shaped tube 58 flows into the vertical branch 64 of the T-shaped tube 58. The water exits the vertical branch 64 of the T-shaped tube 58 within the regeneration tank 12.

The water that is input into the regeneration tank 12 flows through the resin bed 28 and begins to fill the regeneration tank 12. During flow through the ion exchange resin 26 forming the resin bed 28, hardness ions in the water are replaced by sodium or potassium ions. As a result, the ion exchange resin 26 changes the hard water into softened water.

When the water pressure within the regeneration tank 12 increases, softened water if forced into the outlet tube 76. At this time, the fourth valve 78 is in an open position and the fifth valve 82 is in a closed position. The softened water flows through the outlet tube 76 and enters the outlet pipe 42 where the softened water exits the water softening apparatus 10.

Figure 2:
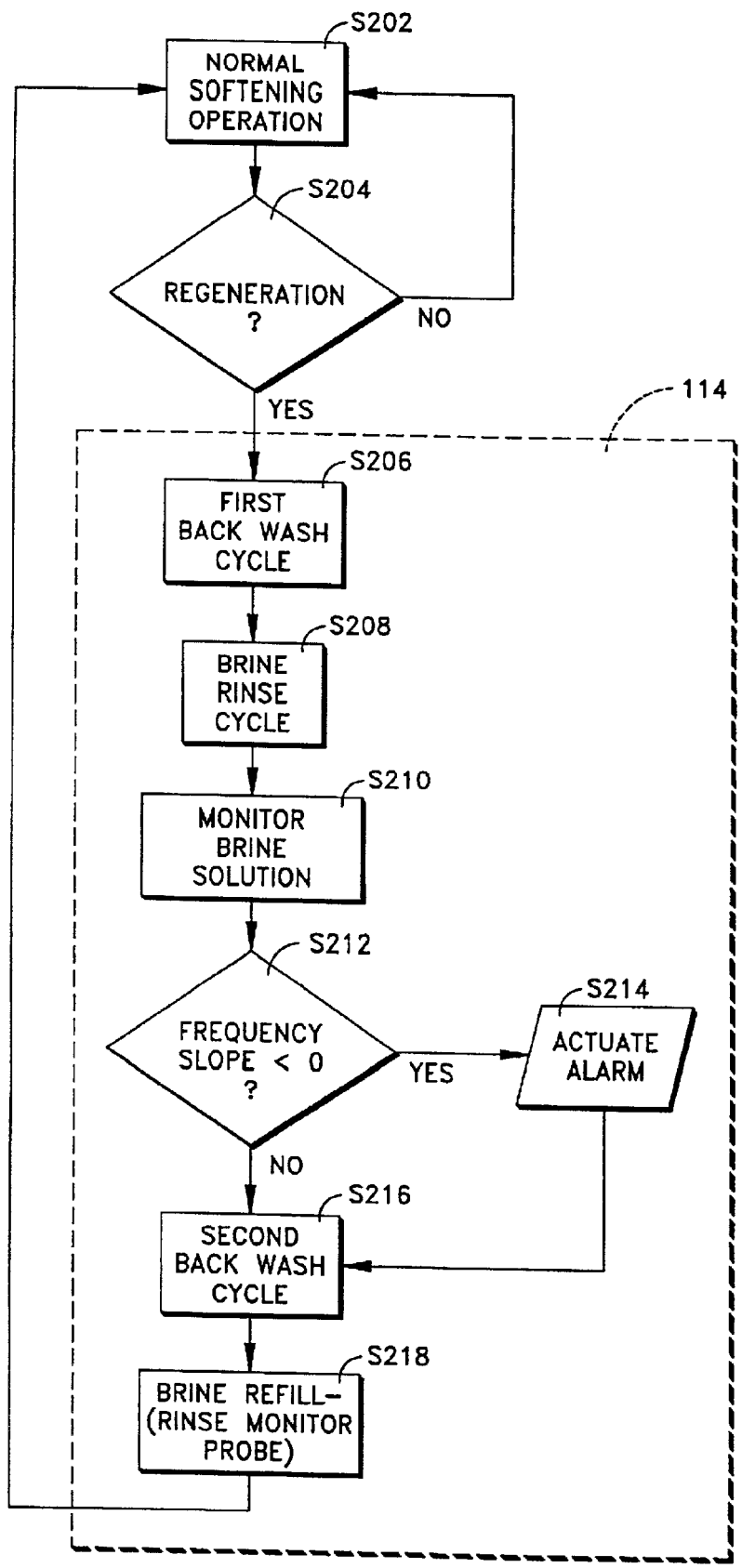
FIG. 2 is a flow chart of the operating process of the water softening apparatus of FIG. 1.

FIG. 2 shows a flow chart of the operation of the water softening apparatus 10 of the present invention. Normal softening operation, as described above, is shown at step S202.

The water softening apparatus 10 operates in the normal softening operation until the ion exchange resin 26 becomes exhausted. The ion exchange resin 26 is exhausted when it no longer replaces hardness ions in the water with sodium or potassium ions. Exhaustion of the ion exchange resin 26 may be estimated by a predetermined amount of time, by a predetermined quantity of water passing through the regeneration tank 12, or by a known device for monitoring the resin bed 28. Examples of such known devices are disclosed in U.S. Pat. Nos. 4,320,010 and 5,234,601. Step S204 in FIG. 2 shows the controller 84 determining whether the ion exchange resin 26 is exhausted and whether regeneration is necessary. If regeneration is not yet necessary, normal softening operation, step S202, continues. If regeneration is necessary, a regeneration cycle, shown schematically by 114 in FIG. 2, begins.

The regeneration cycle 114 includes three distinct steps. The first step of the regeneration cycle 114 is a first back wash cycle, indicated as step S206 in FIG. 2. The second step is a brine rinse cycle, step S208. The third step is a second back wash cycle, step S216. During the regeneration cycle 114, the first valve 44 is opened to allow water flow from the inlet pipe 40 to the outlet pipe 42. As a result, there is no disturbance in the water supply during the regeneration cycle 114.

During the first back wash cycle, step S206 in FIG. 2, the first valve 44 is opened, the second valve 48 is closed, the third valve 66 is opened, the fourth valve 78 is opened, and the fifth valve 82 is closed. As a result, water flows from the inlet pipe 40 to the outlet pipe 42. A portion of the water enters the outlet tube 76 and flows downwardly through the fourth valve 78 and into the regeneration tank 12. As the water fills the regeneration tank 12, water is forced into the vertical branch 64 of the T-shaped tube 58. Water flows up the vertical branch 64 of the T-shaped tube 58 and into the horizontal branch 62 of the T-shaped tube 58. Since the second valve 48 is closed and the third valve 66 is opened, water flows through the third valve 66, into the first drain tube 72, and into a drain.

Thus, during the first back wash cycle, water flows through the regeneration tank 12 in a direction opposite to the flow of water during normal softening operation. The first back wash cycle removes any bulk impurities from the ion exchange resin 26. To prevent the ion exchange resin 26 from being removed from the regeneration tank 12 during the first back wash cycle, a porous screen (not shown) may overlie either the ion exchange resin 26 or an inlet to the vertical branch 64 of the T-shaped tube 58.

After completion of the first back wash cycle, the brine rinse cycle, step S208 in FIG. 2, begins. During the brine rinse cycle, the first valve 44 remains open, the second valve 48 is positioned in a third open position, the third valve 66 is closed, the fourth valve 78 is closed, and the fifth valve 82 is opened. In the third open position, the second valve 48 prevents flow from the feed tube 46 and allows flow between the brine tank 14 and the regeneration tank 12.

The valve 63, which is associated with the mechanism 60, is also electrically connected to the controller 84, as shown schematically in FIG. 1. At step S208, the valve 63 is also energized to permit flow of water to the mechanism. The mechanism 60 operates to bring brine solution from the brine tank 14, through the brine tank tube 74 to mix with the flow of water to provide a diluted brine solution. Specifically, a Bernoulli effect is developed by running of water past an orifice to create a suction force.

The brine solution passes through the connecting tube 56, through the second valve 48, and into the T-shaped tube 58. Since the third valve 66 is closed, all of the brine solution flows through the vertical branch 64 of the T-shaped tube 58 and into the regeneration tank 12.

As the brine solution is flowing through the connecting tube 56, the electrodes 92 and 94 of the probe 90 become immersed in the brine solution. While the electrodes 92 and 94 are immersed in the brine solution, the conductivity of the brine solution is monitored, as shown by step S210 in FIG. 2.

As stated above, the brine solution is salt water. The presence of salt in the water makes the water more conductive. Thus, when the water is completely saturated with salt, a resistance between the electrodes 92 and 94 of the probe 90, both of which are immersed in the brine solution, is minimized. When the resistance between the electrodes 92 and 94 is minimized, the impedance is minimized.

When the amount of salt 38 in the brine tank 14 is less than an amount needed for saturation of the brine solution, a portion of the brine solution nearer the bottom surface 32 of the brine tank 14 will include a higher concentration of salt than a portion of brine solution near the top surface 30 of the brine tank 14. When the brine solution is pumped through the connecting tube 56, the brine solution is drawn from near the bottom surface 32 of the brine tank 14. As a result, the portion of the brine solution having a higher concentration of salt passes through the connecting tube 56 before the portion of brine solution having a lesser concentration of salt.

As the brine solution passes through the connecting tube 56 and over the electrodes 92 and 94 of the probe 90, the conductivity of the brine solution decreases as the concentration of salt in the brine solution decreases. Decreased conductivity results in increased impedance.

As the impedance of the brine solution increases, the frequency of an output signal from the monitoring circuit 88 decreases. Since the portion of the brine solution having a higher concentration of salt passes the probe 90 before the portion of brine solution having a lesser concentration of salt, the frequency of the output signal from the monitoring circuit 88 will decrease over time. A decreasing frequency over time indicates a frequency slope that is less than zero. Step S212 in FIG. 2 show the controller 84 determining if the frequency slope is less than zero. When the slope of the frequency is less than zero, the controller 84 actuates an alarm 108 or 110, step S214 in FIG. 2. Less than zero as used herein means a predetermined amount less than zero. Ideally, a frequency slope of less than zero will indicate a change in the salt concentration of the brine solution; however, impurities that may be present in the brine solution may cause the frequency to vary slightly even when the brine solution is saturated with salt.

After flowing over the electrodes 92 and 94, the brine solution enters the regeneration tank 12 and flows through the ion exchange resin 26. While passing through the ion exchange resin 26, the brine solution replaces the hardness ions being held by the ion exchange resin 26 with sodium or potassium ions. Thus, the brine solution returns the ion exchange resin 26 to a form necessary for normal softening operation.

As the pressure of the brine solution in the regeneration tank 12 increases, the brine solution is forced into the outlet tube 76. Since the fourth valve 78 is closed and the fifth valve 82 is open, the brine solution flows through the second drain tube 80 and into a drain.

After the brine rinse cycle is complete, the second back wash cycle, step S216 in FIG. 2, begins. The second back wash cycle is identical to the first back wash cycle. The second back wash cycle rinses impurities from the resin bed 28 and also removes salt residue from the resin bed 28.

After the second back wash cycle is completed, the second valve 48 is switched to the first open position and the brine tank 14 is again filled with water to form another brine solution, as shown by step S218 in FIG. 2. The water flowing into the brine tank 14 passes through the connecting tube 56. This water also immerses the electrodes 92 and 94 of the probe 90 of the sensor 86 and rinses any salt residue from the electrodes 92 and 94. As a result, salt is prevented from building up on the electrodes 92 and 94 and corrosion is prevented.

After the brine tank 14 is filled with water, the first valve 44 is closed and the second valve 48 is switched to the second open position. Normal softening operation, step S202 in FIG. 2, again takes place.

After numerous regeneration cycles, the salt 38 in the brine tank 14 is depleted. The addition of water to the brine tank results in a brine solution that is unsaturated with salt 38. As a result, when the brine solution flows over the electrodes 92 and 94 of the probe 90 of the sensor 86, a frequency slope relative to time will be less than zero. When a frequency slope of less than zero is detected, the controller 84 actuates either or both of the visual and audible alarms 108 and 110.

Although in one embodiment, the probe 90 for the sensor 86 is mounted in the connecting tube 56, the probe 90 may be located at any location in the water softening apparatus 10 where there is a relative movement between the brine solution and the probe 90. For example, the probe 90 may be located in a tube (not shown) connecting the bottom of the brine tank 14 to the top of the brine tank 14 so that the concentration of salt 38 in the brine solution can be monitored at a time other than during the brine rinse cycle.

Figure 4:
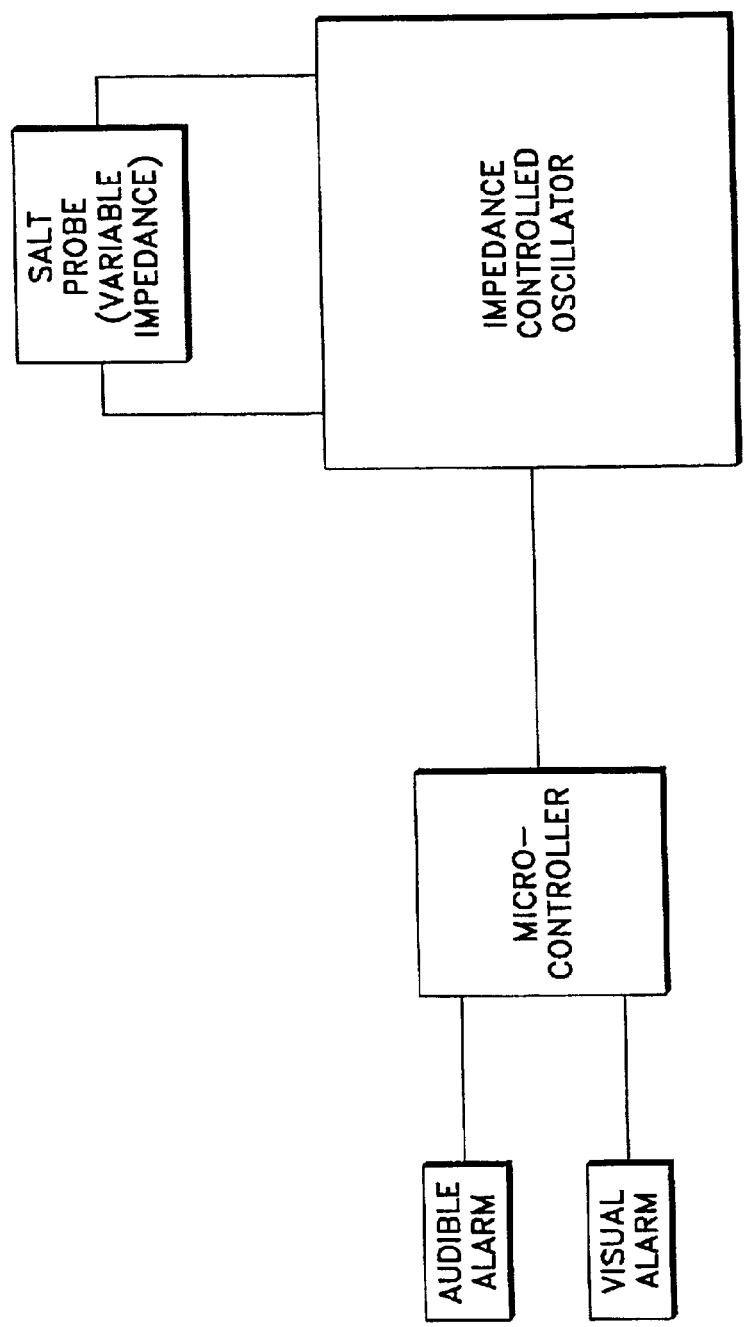
FIG. 4 is a general overview of one aspect of the present invention.

Turning now to FIG. 4, a generalized overview of the present invention is depicted. The generalized overview encompasses the embodiment discussed in detail above. As such, the generalized overview should be viewed to provide an understanding of the scope of the present invention and the many possible embodiments that fall within the scope of the present invention.

Figure 5:
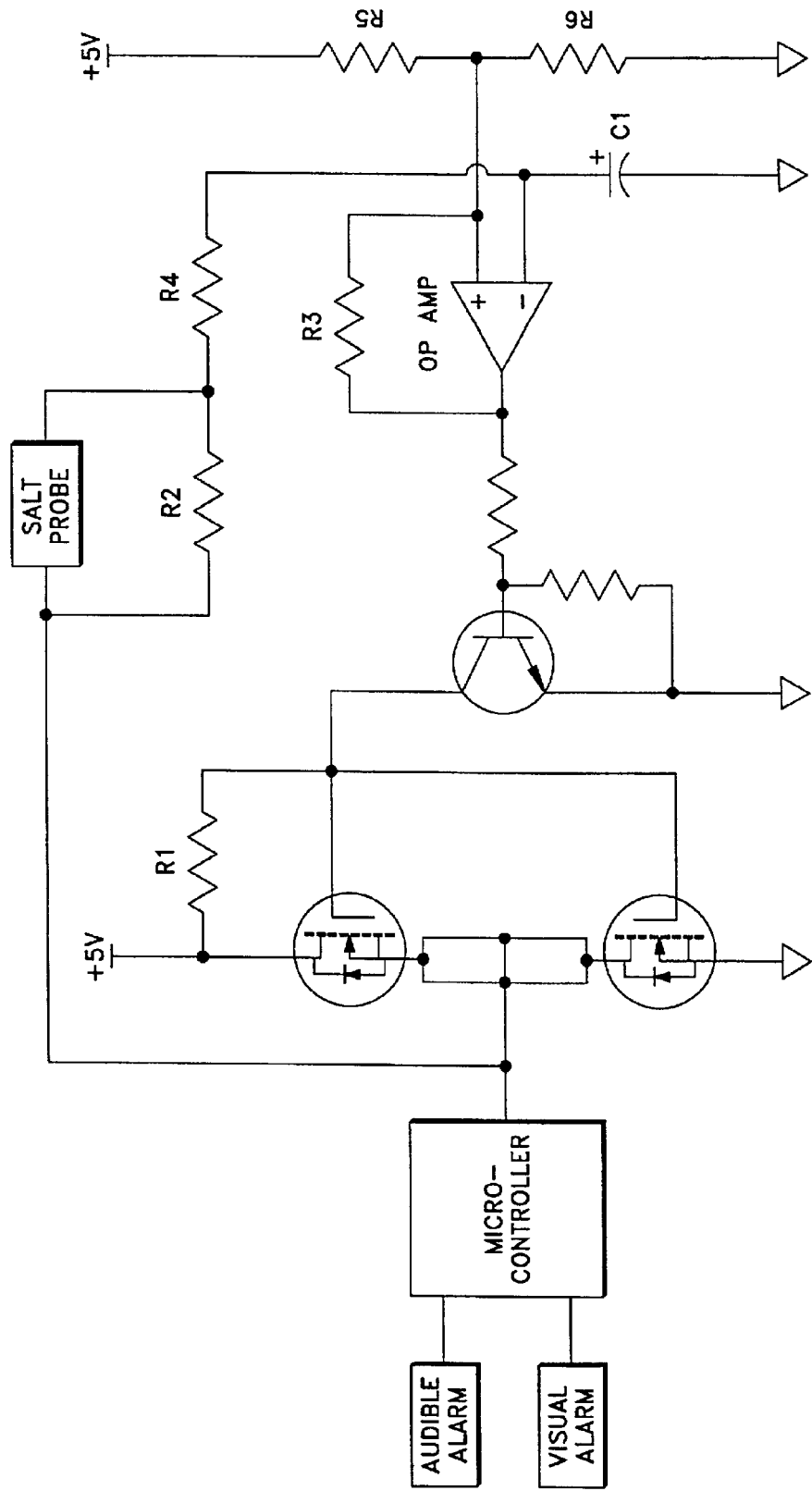
FIG. 5 is a schematic illustration of an example of a possible embodiment.

As one example, attention is directed to FIG. 5 that shows one of the many possible embodiments. The illustrated circuit performs a similar function using an op amp with a feed forward (R3) which allows a settable hysteresis band (as opposed to the 74HC14 which has fixed hysteresis). As an example, if R3, R5, and R6 were all 10K resistors, the trip points for the oscillator would be approximately ⅓ and ⅔ Vcc. By changing the value of R3, the frequency range of the oscillator may be changed. The other significant change is the output drivers. These drivers are charging and discharging the capacitor and have very little impedance (as opposed to the 74HC14 whose output impedance is significant relative to the probe) and have little affect on the frequency as it increases.

From the above description of the invention, those skilled in the art will perceive improvements, changes and modifications. Such improvements, changes and modifications within the skill of the art are intended to be covered by the appended claims.

Having described the invention, I claim the following:

1. A water softening apparatus comprising:
   a regeneration tank for receiving hard water and for outputting softened water;
   an ion exchange resin located within the regeneration tank for exchanging hardness ions in hard water with sodium or potassium ions;
   a brine tank for holding salt to mix with water to form a brine solution, the brine solution periodically being input into the regeneration tank to regenerate the ion exchange resin;
   a sensor for generating an oscillating output signal having a frequency that is indicative of the conductivity of the brine solution; and a controller for receiving the output signal of the sensor and monitoring the frequency of the output signal over a period of time to determine whether a change in the frequency of the output signal exceeds a threshold amount, change in the frequency exceeding a threshold amount being indicative of depletion of salt in the brine tank.

2. The water softening apparatus of claim 1, wherein the frequency of the output signal decreases as impedance of the brine solution increases.

3. The water softening apparatus of claim 2, wherein the sensor includes a probe having at least two electrodes for immersion in the brine solution, the electrodes and the brine solution providing a circuit that has impedance related to salt content of the brine solution.

4. The water softening apparatus of claim 3 further including at least one alarm electrically connected to and actuatable by the controller, the controller actuating the alarm when the change in the frequency over time exceeds the threshold amount.

5. The water softening apparatus of claim 4, further including a tube, the electrodes of the probe of the sensor are mounted in the tube and monitor the conductivity of the brine solution during flow of the brine solution through the tube.

6. Th water softening apparatus of claim 5, wherein the period of time for monitoring the frequency is a time period of flow or a portion thereof of brine solution through the tube.

7. The water softening apparatus of claim 5, wherein the tube is interposed between the brine tank and the regeneration tank and receives a flow of brine solution during a regeneration cycle, and the tube also receives a flow of water during filling of the brine tank such that the electrodes are rinsed by the water filling the brine tank.

8. A method performed within a water softening apparatus, the method comprising:
   exchanging hardness ions in hard water with sodium or potassium ions via an ion exchange resin located within a regeneration tank;
   mixing salt with water to form a brine solution within a brine tank;
   inputting brine solution into the regeneration tank to regenerate the ion exchange resin, the inputting occurring via flow through a tube connected with the brine tank and the regeneration tank;
   sensing the conductivity of the brine solution as the brine solution flows through the tube; and
   generating an oscillating output signal having a frequency that is indicative of the conductivity of the brine solution, the conductivity of the brine solution being indicative of an amount of salt in the brine solution.

9. The water softening apparatus of claim 1, wherein the sensor that a capacitor that is alternatively charged and discharged to provide the oscillating signal.

10. A water softening apparatus comprising:
    a regeneration tank for receiving hard water and for outputting softened water;
    an ion exchange resin located within the regeneration tank for exchanging hardness ions in hard water with sodium or potassium ions;
    a brine tank for holding salt to mix with water to form a brine solution, the brine solution being input into the regeneration tank to regenerate the ion exchange resin;
    a tube connected with the brine tank for receiving a flow of brine solution from the brine tank during regeneration of the ion exchange resin;
    a sensor at the tube for sensing conductivity of the brine solution as the brine solution flows through the tube, the sensor generating a signal indicative of the conductivity of the brine solution, the conductivity of the brine solution being indicative of an amount of salt in the brine solution; and
    an inlet water line connected to the connecting tube for supplying water to the brine tank and for inputting water to the regeneration tank, the inlet water line is interposed between the regeneration tank and the sensor so that, upon supplying water to the brine tank, water flows over the electrodes of the probe of the sensor to rinse the electrodes.

11. The water softening apparatus of claim 10, wherein the sensor comprises a probe having at least two electrodes for immersion in the brine solution, the electrodes and the brine solution provide a circuit that has an impedance related to salt content of the brine solution.

12. The water softening apparatus of claim 11, wherein the tube is a connecting tube that is interposed between the brine tank and the regeneration tank and through which brine solution flows toward the regeneration tank.

13. The water softening apparatus of claim 11, further comprising a controller, electrically connected to the sensor, for receiving the signal generated by the sensor and for monitoring the signal for a change of impedance of the brine solution relative to time as the brine solution flows through the tube.

14. The water softening apparatus of claim 13, wherein the sensor generates an oscillating output signal, the controller monitors for a change in a frequency of the output signal relative to time as a result of the change in impedance of the brine solution.

15. The water softening apparatus of claim 14 further comprising at least one actuatable alarm electrically connected to the controller, the controller actuating the alarm when a slope of the frequency relative to time is beyond a threshold level indicative of salt depletion in the brine tank.

16. A water softening apparatus comprising:
    a regeneration tank for receiving hard water and for outputting softened water;
    an ion exchange resin located within the regeneration tank for exchanging hardness ions in hard water with sodium or potassium ions;
    a brine tank for holding salt to mix with water to form a brine solution, the brine solution being input into the regeneration tank to regenerate the ion exchange resin;
    a tube connected with the brine tank for receiving a flow of brine solution from the brine tank during regeneration of the ion exchange resin;
    a sensor at the tube for sensing conductivity of the brine solution as the brine solution flows through the tub, the sensor generating a signal indicative of the conductivity of the brine solution, the conductivity of the brine solution being indicative of an amount of salt in the brine solution;
    wherein the sensor generates an oscillating output signal, the controller monitors for a change in a frequency of the output signal relative to time as a result of the change in impedance of the brine solution.

17. The water softening apparatus of claim 16, wherein the sensor comprises a probe having at least two electrodes for immersion in the brine solution, the electrodes and the brine solution provide a circuit that has impedance related to salt content of the brine solution.

18. The water softening apparatus of claim 17 further comprising a controller, electrically connected to the sensor, for receiving the signal generated by the sensor and for monitoring the signal for a change of impedance of the brine solution relative to time as th brine solution flows through the tube.

19. The water softening apparatus of claim 16 further comprising at least one actuatable alarm electrically connected to the controller, the controller actuating the alarm when a slope of the frequency relative to time is beyond a threshold level indicative of salt depletion in the brine tank.

20. The water softening apparatus of claim 16 further comprising an inlet water line connected to the connecting tube for supplying water to the brine tank and for inputting water to the regeneration tank, the inlet water line is interposed between the regeneration tank and the sensor so that, upon supplying water to the brine tank, water flows over the electrodes of the probe of the sensor to rinse the electrodes.

* * * * *